(12) United States Patent　(10) Patent No.:　US 12,689,812 B2
D'Aleo　(45) Date of Patent:　Jul. 21, 2026

(54) MULTISPECTRAL IMAGE SENSOR, CAMERA SYSTEM AND METHOD OF MANUFACTURING A MULTISPECTRAL IMAGE SENSOR

(71) Applicant: ams International AG, Jona (CH)

(72) Inventor: Francesco Paolo D'Aleo, Samstagern (CH)

(73) Assignee: ams International AG, Jona (CH)

( * ) Notice: Subject to any disclaimer, the term of this patent is extended or adjusted under 35 U.S.C. 154(b) by 5 days.

(21) Appl. No.: 18/872,441

(22) PCT Filed: May 23, 2023

(86) PCT No.: PCT/EP2023/063790
§ 371 (c)(1),
(2) Date: Dec. 6, 2024

(87) PCT Pub. No.: WO2023/237329
PCT Pub. Date: Dec. 14, 2023

(65) Prior Publication Data
US 2025/0317634 A1　Oct. 9, 2025

(30) Foreign Application Priority Data

Jun. 10, 2022　(DE) ..................... 10 2022 114 678.2

(51) Int. Cl.
*H04N 23/80*　(2023.01)
*H04N 23/11*　(2023.01)
(Continued)

(52) U.S. Cl.
CPC ............. *H04N 23/11* (2023.01); *H04N 23/12* (2023.01); *H04N 23/53* (2023.01); *H04N 23/56* (2023.01); *H04N 23/80* (2023.01); *H04N 23/955* (2023.01)

(58) Field of Classification Search
CPC ........ H04N 23/11; H04N 23/12; H04N 23/53; H04N 23/56; H04N 23/80; H04N 23/955; H04N 25/76
See application file for complete search history.

(56) References Cited

U.S. PATENT DOCUMENTS

2005/0030625 A1* 2/2005 Cattin-Liebl .......... G01T 1/295
359/560
2011/0019056 A1　1/2011 Hirsch et al.
(Continued)

FOREIGN PATENT DOCUMENTS

EP　1 494 046 A1　1/2005
EP　3 633 968 A1　4/2020
(Continued)

OTHER PUBLICATIONS

International Search Report issued for corresponding International Patent Application No. PCT/EP2023/063790 on Aug. 28, 2023 (4 pages).

(Continued)

*Primary Examiner* — Alazar Tilahun
(74) *Attorney, Agent, or Firm* — Hauptman Ham, LLP

(57) ABSTRACT

A multispectral image sensor includes a plurality of photosensitive elements configured to capture electromagnetic radiation received from a scene or an object, and first and second optical modulators arranged on an incident side of the plurality of photosensitive elements. The first and second optical modulators are configured to modulate electromagnetic radiation within respective first and second wavelength ranges, and to transmit electromagnetic radiation outside the respective first and second wavelength ranges. The first wavelength range is different from the second wavelength range.

20 Claims, 3 Drawing Sheets

(51) Int. Cl.

| | |
|---|---|
| *H04N 23/12* | (2023.01) |
| *H04N 23/53* | (2023.01) |
| *H04N 23/56* | (2023.01) |
| *H04N 23/955* | (2023.01) |

(56) References Cited

U.S. PATENT DOCUMENTS

| | | | |
|---|---|---|---|
| 2017/0251137 A1 * | 8/2017 | Evans, V | ............... H04N 23/51 |
| 2020/0049550 A1 | 2/2020 | Graham | |
| 2021/0234114 A1 | 7/2021 | Li et al. | |
| 2022/0146310 A1 | 5/2022 | Houck et al. | |

FOREIGN PATENT DOCUMENTS

| | | | |
|---|---|---|---|
| EP | 3 731 521 A1 | 10/2020 | |
| WO | WO-2020010810 A1 * | 1/2020 | ............. H04N 23/57 |
| WO | 2022/018527 A1 | 1/2022 | |

OTHER PUBLICATIONS

Written Opinion issued for corresponding International Patent Application No. PCT/EP2023/063790 on Aug. 28, 2023 (7 pages).

Asif et al., "FlatCam: Thin, Bare-Sensor Cameras using Coded Aperture and Computation", arXiv: 1509.00116 Sep. 1, 2015, pp. 1-12 (12 pages).

Galvis et al., "Shifting colored coded aperture design for spectral imaging", Applied Optics, vol. 58, No. 7, Mar. 1, 2019, pp. B28-B38 (11 pages).

Reshetouski et al., "Lensless Imaging with Focusing Sparse URA Masks in Long-Wave Infrared and its Application for Human Detection", 16th European Conference, Computer Vision, 2020, pp. 1-17 (17 pages).

Saito et al., "Multidimensional imaging using a lensless randomly coded aperture camera", SPIE Optical Engineering + Applications, vol. 11500, 2020, pp. 115000A-1~115000A-9 (10 pages).

* cited by examiner

MULTISPECTRAL IMAGE SENSOR, CAMERA SYSTEM AND METHOD OF MANUFACTURING A MULTISPECTRAL IMAGE SENSOR

CROSS REFERENCE TO RELATED APPLICATION

This application is a National Stage of International Application No. PCT/EP2023/063790, filed on May 23, 2023, which designates the United States and was published in Europe, and which claims priority to German Patent Application No. 10 2022 114 678.2, filed on Jun. 10, 2022, in the German Patent and Trade Mark Office. Both of the aforementioned applications are hereby incorporated by reference in their entireties.

This disclosure relates to a lensless multispectral image sensor, a camera system comprising such an image sensor, and to a method of manufacturing a multispectral image sensor.

A large and increasing variety of electronic devices rely on cameras for image capture as well as for applications that require feature recognition, e.g. for identification purposes. Therein, applications requiring feature recognition as well as applications for monitoring an object or a scene, e.g. by performing distance measurements, are typically realized in a wavelength range outside the visible spectrum, e.g. in the infrared domain, for eye-safety purposes and for the fact that a user is not disturbed or distracted. In order to enable both imaging in the visible domain and applications requiring feature recognition, conventionally multiple image sensors are employed, with each image sensor being dedicated to a specific application, i.e. wavelength range. However, as modern-day devices become increasingly sophisticated in terms of functionality in combination with a minimal footprint of an image sensor being limited, the need for multispectral image sensors has arisen.

Conventional approaches, however, employ lens-based solutions with dispersive elements that due to their multispectral sensitivity often require complicated and bulky arrangements of the components or expensive materials for the lens elements. In addition, lens-based systems are characterized by a significant vertical height, which in addition to footprint often pose an additional limitation due to space constraints.

Thus, an object to be achieved is to provide a multispectral image sensor that overcomes the limitations of existing solutions. A further object is to provide a camera system comprising such an image sensor, and a method of manufacturing such an image sensor.

These objects are achieved with the subject-matter of the independent claims. Further developments and embodiments are described in dependent claims.

This disclosure overcomes the abovementioned limitations of modern day devices by providing a lensless image sensor having photosensitive elements with broadband sensitivity and a stack of layers above the photosensitive elements, wherein each layer comprises an optical modulator that interacts with a narrow wavelength range, wherein the optical modulators each interact with a different wavelength range and transmit all other relevant optical wavelengths.

In an embodiment, a multispectral image sensor comprises a plurality of photosensitive elements, wherein each photosensitive element is configured to capture electromagnetic radiation received from a scene or an object and to generate a photo signal depending on the captured electromagnetic radiation. The image sensor further comprises a first optical modulator arranged on an incident side of the plurality of photosensitive elements, the first optical modulator being configured to modulate electromagnetic radiation within a first wavelength range, and to transmit electromagnetic radiation outside the first wavelength range.

The image sensor further comprises a second optical modulator arranged on an incident side of the plurality of photosensitive elements, the second optical modulator being configured to modulate electromagnetic radiation within a second wavelength range, and to transmit electromagnetic radiation outside the second wavelength range. Therein, the first wavelength range is different form the second wavelength range.

The photosensitive elements are configured to capture the electromagnetic radiation received from the scene or the object, e.g. light from a natural source or an illuminating light source that is reflected off the scene or object. The photosensitive elements possess a sensitivity that covers at least the first and second wavelength ranges. For example, the photosensitive elements have a broadband sensitivity. The photosensitive elements each generate a photo signal depending on the captured electromagnetic radiation by the respective element. The photosensitive elements form the capturing portion of an image sensor and can be arranged on a substrate body, e.g. a wafer or chip substrate. For example, the capturing portion is formed from a matrix of pixels, wherein each pixel includes a photosensitive element, e.g. a photodiode.

The first and second optical modulators are arranged between the object or scene and an active capturing surface of the image sensor formed from the photosensitive elements. For example, the first optical modulator is realized on or within a first layer, e.g. a thin film substrate, which is arranged on a photosensitive surface of the capturing portion. The first layer is disposed on a top surface of the substrate body, for instance. The second optical modulator can be realized on or within a second layer, e.g. a thin film substrate, which is arranged on a surface of the first layer facing away from the photosensitive surface. In other words, the optical modulators form a stack that is arranged on the photosensitive surface of the capturing portion. The first optical modulator modulates light within a first wavelength range that is different from the second modulation range, at which the second optical modulator operates. Specifically, the first optical modulator is transmissive at the second wavelength range and the second optical modulator is transmissive at the first wavelength range. In other words, an optical modulator is transparent for optical wavelengths other than its modulation wavelength range.

This means that the image sensor can be configured to capture a first set of photo signals during a first exposure phase in the first wavelength range, e.g. in conjunction with an illuminating light source that illuminates the scene or object with light at the first wavelength range, and a second set of photo signals during a second exposure phase in the second wavelength range, e.g. in conjunction with a further illuminating light source that illuminates the scene or object with light at the second wavelength range.

Alternatively, the information of both the first and second wavelength ranges can be separately extracted from a set of photo signals captured during a single exposure phase by means of applying an algorithm for reconstructing the image. In such embodiments, the image sensor during said single exposure generates a set of photo signals in response to light captured in both the first and second wavelength ranges, e.g. in conjunction with an illuminating light source that illuminates the scene or object with light at the first and second wavelength ranges.

Different from conventional imaging using optical lenses, in which each pixel of an image sensor captures light from a distinct region of an object or scene to be imaged, employing an optical modulator, and hence realizing lens-less imaging, results in an encoding of the object or scene information, e.g. by having a different system response for each pixel of image sensor. Therein, each pixel of the image sensor can be understood as capturing an effective weighted sum of system response functions from each point of the object or the scene. A computational inverse algorithm can be employed on the photo signals for reconstructing the image. Therein, a first algorithm can reconstruct the image at the first wavelength range and a second algorithm can reconstruct the image at the second wavelength range of the very same set of photo signals. The optical modulators can be illumination-modulated, mask-modulated, or be realized as programmable-modulator systems.

In some embodiments, the first and second wavelength ranges do not overlap. In order to ensure that the first optical modulator transmits the second wavelength range without performing any modulation and vice versa, the first and second optical modulators can be configured to modulate respective wavelength ranges that do not overlap, i.e. which are spectrally separated. This way, an algorithm applied for image reconstruction can be tailored to each optical modulator without the respective other optical modulator falsifying the captured photo signals.

In some embodiments, the first wavelength range is in the visible, near-infrared, NIR, or short-wavelength infrared, SWIR, portion of the electromagnetic spectrum. For example, the first wavelength range is a range around 840 and/or 930 nm. This wavelength range is invisible to the human eye such that an optional illumination of a scene or object does not affect its appearance to the user. Moreover, some applications like 3D mapping or identification pro-cesses are typically performed in this domain. In addition, in this wavelength range well-established technologies for optional light emitters and photosensitive elements can be employed for an efficient and cost-effective manufacturing and operation of the image sensor. For example, the photo-sensitive elements are silicon photodiodes which show sen-sitivities in the visible domain as well as in the NIR domain up to about 1100 nm. In order to limit a sensitivity of the photosensitive elements to the first and second wavelength ranges, the photosensitive elements can comprise optical filter elements for blocking visible light, for instance.

In some embodiments, the second wavelength range is in the visible, near-infrared, NIR, or short-wavelength infrared, SWIR, domain of the electromagnetic spectrum. The second wavelength range can be in the same domain as the first wavelength range, however, covering a different portion of the domain. For example, the first wavelength range is a range comprising 840 nm, while the second wavelength range includes 930 nm. Alternatively, the first or second wavelength range can be from a different domain as the respective other range, such as the SWIR, visible or UV range.

In some embodiments, the photosensitive elements are silicon-based photodiodes or organic photodetectors, OPDs. The photosensitive elements can be manufactured according to different technologies and thus tailored to a specific application in terms of sensitivity, power consumption and size, for instance. Therein, organic photodiodes are charac-terized by a lower power consumption compared to their semiconductor counterparts. However, the manufacturing of semiconductor photodiodes is well established and can easily be combined with manufacturing other elements, such as light emitters and integrated circuit elements following similar and compatible processes. The photosensitive ele-ments can be silicon micro-photodiodes for a targeted sen-sitivity in the NIR range, for instance.

In some embodiments, the multispectral image sensor further comprises a plurality of display pixels configured to generate a display image in the visible domain of the electromagnetic spectrum. The display pixels are formed from visible light emitters that are configured to emit light in the visible domain of the electromagnetic spectrum, i.e. at optical wavelengths ranging from 400 to 750 nm. For example, the display pixels are formed from RGB light-emitting micro LEDs and are arranged in a two-dimensional matrix for forming a screen for displaying content. Therein, the light emitters of the pixels can be controlled to output a certain respective color, or each pixel is formed by red, green and blue subpixels, for instance. The pixels can be connected to a controller that controls an image to be displayed on the screen formed by the pixels. The display pixels and the photosensitive elements can be arranged on one or more transparent substrates, e.g. a glass or thin film substrate, or a transparent foil. Therein, the term "transparent" refers to the visible portion of the electromagnetic spectrum, i.e. light of wavelengths, at which the human eye is sensitive at. The first and second optical modulators can be configured to transmit visible light.

In some embodiments, the plurality of display pixels form an OLED display, a micro-LED display or a liquid crystal display, LCD. The above-mentioned displaying elements can be formed from existing technologies already employed in transparent displays such as OLEDs or LCDs. Particularly the manufacturing of micro-LEDs can be easily combined with the manufacturing process of micro photodiodes. Like the photosensitive elements, the display pixels can be formed according to various technologies depending on a requirement of the intended application.

Micro-LEDs (light emitting diode, short: LED) are semi-conductor light emitting diodes with a particularly small size. For example, a growth substrate for an epitaxial growth of a semiconductor layer sequence of the micro-LED is removed from the micro-LED. In other words, the micro-LED does not comprise the growth substrate. For example, a thickness or height of the micro-LED in a growth direction of the semiconductor layer sequence is between 1.5 µm and 10 µm.

A light emission surface of the micro-LED can be rect-angular or can have a different shape, for example. In particular, each lateral extension of the light emission sur-face is at most 100 µm or at most 70 µm in plan view of layers of the semiconductor layer sequence. For example, if the micro-LED has a rectangular shape, an edge length of the micro-LED—in particular in plan view of layers of the semiconductor layer sequence—is at most 70 µm or at most 50 µm.

For example, micro-LEDs are provided on wafers with detachable holding structures, such that the micro-LED can be detached from the wafer non-destructively. Micro-LEDs may also be referred to as µLEDs, µ-LEDs, uLEDs, u-LEDs, or Micro Light Emitting Diodes.

In some embodiments, the multispectral image sensor further comprises a plurality of illuminating light emitters configured to illuminate a scene or an object with electro-magnetic radiation within the first and/or second wavelength range. The illuminating light emitters are configured to emit light at an optical illumination wavelength that comprises the first and/or second wavelength range, e.g. light in the NIR domain in the range of 750 nm and 1.4 μm and/or in the SWIR domain in the range of 1.4 μm and 3 μm. The illuminating light emitters can be arranged on the same substrate as the photosensitive elements and/or the optional display pixel. For example, the capturing portion of the image sensor is formed from a matrix of pixels, wherein each pixel incorporates a subpixel having a light emitter in the NIR or SWIR domain, and a subpixel having a photo-sensitive element. Alternatively, only some of the pixels can incorporate a subpixel having an illuminating light emitter, e.g. the pixels along the periphery of the capturing portion. Yet alternatively, the illumination light emitters can be arranged independently from the photosensitive elements, e.g. forming a frame around the capturing portion or being arranged on a further substrate.

In some embodiments, the illuminating light emitters are OLEDs, micro-LEDs or vertical-cavity surface-emitting lasers, VCSELs. The optional light emitters for illuminating the scene or object can be selected from various existing technologies such as organic LEDs, or micro LEDs. For example, the illuminating light emitters are of a same architecture as the photosensitive elements, e.g. both are semiconductor or organic diode structures, such that they can be easily manufactured on the same substrate following the same or a similar manufacturing process. Alternatively, the illuminating light emitters can be of a different archi-tecture, e.g. the display pixels are formed from OLEDs and the photosensitive elements are realized as micro photo-diodes or vice versa. This way, they can be manufactured separately on different substrates, for instance, in order to tailor the display technology and the illumination to a specific application. Moreover, in terms of a requirement of an illumination with coherent light or with a higher range, the illuminating light emitters can be formed from VCSELs, likewise arranged on the same substrate as the photosensi-tive elements or on a different substrate.

In some embodiments, the first and/or second optical modulator is realized by an active matrix that is based on one of: liquid crystals, optical switches, digital light processors and spatial light processors. The image sensor in these embodiments can further comprise a controller for control-ling elements of the active matrix. Dynamic and program-mable modulators, also referred to as spatial light modula-tors, can be used as an alternative to fixed masks. For example, the active matrix is based on liquid crystal tech-nology, which can be used for programmable amplitude modulation. For programmable phase modulation, LC on silica devices can be employed in the active matrix. Further examples include vanadium oxide transistors acting as opti-cal switches in the NIR region while being transmissive at visible frequencies. Programmable modulators have the advantage that a mask pattern can be easily and quickly changed such that multiple images, each with different optical encoding, can be captured in a subsequent manner.

Moreover, in embodiments with a relatively small number photosensitive elements, programmable modulators can facilitate the obtainment of sufficient measurements for reconstruction. Also, in case of a sensor array of photosen-sitive elements, the ability to change the modulation pattern between acquisitions provides an extra degree of freedom that can further improve a reconstruction performance or a resolution of the reconstructed image. However, an active matrix requires additional components such as the afore-mentioned controller as well as being characterized by an additional power consumption channel.

In some embodiments, the first and/or second optical modulator is realized by a passive matrix that is based on one of: an amplitude mask, a phase mask, and a plurality of diffractive elements. Alternatively to an active matrix, one or both of the optical modulators can perform a modulation passively using amplitude masks, diffractive masks, random reflective surfaces and modified micro lens arrays. Therein, amplitude modulators comprise transparent and occluding regions arranged in some fixed spatial pattern on a 2D mask. Phase modulators, on the other hand, alter the relative optical path length or effective phase retardation in a 2D pattern. Phase masks can be more light efficient due to non-existent or negligible attenuation of the incoming light, and they can concentrate light to create sharper and higher-contrast patterns on the image sensor, thus also improving the image reconstruction performance.

In some embodiments, the first and/or second optical modulator is realized by a spatially distributed plurality of pinholes. An amplitude mask passes, blocks, or attenuates incident light. One of the simplest architectures of a binary amplitude mask is a distribution of pinholes. Amplitude masks typically have the advantage of being easier to fabricate for a wide range of wavelengths. Outside the visible range, materials that can block light are easier and cheaper to find than those that can refract light, for instance. In particular, materials transmissive in the visible range and opaque in the NIR or SWIR range can be easily formed into an optical modulator mask. For example, dye-based poly-mers such as the Fujifilm SIR850 W, SIR850N, or SIR940 can be applied to form the amplitude masks. These polymers show a narrow band of absorption in the infrared band between 850 and 940 nm, while maintaining a high trans-parency in the visible range. Their thickness ranges from 0.8 to 1.36 μm. A further example of an optical modulator suitable for lensless imaging is a diffusor. Besides an ampli-tude modulation, the interaction of light with the pinholes can be based on modulation of an incoming light phase or polarization. To this end, phase-shifting materials can be used in the range of the illumination wavelength as long as they are transparent in the respective other wavelength range of the other optical modulator.

In some embodiments, the first and/or second optical modulator forms a coded aperture mask, in particular char-acterized by a uniformly redundant array, URA, or an optimized random pattern, ORA. For computational imag-ing purposes, the optical modulators of the lensless system can be a regular pattern such as uniformly redundant arrays, URA, and random (or pseudo-random) M-sequences. In lensless imaging, coded apertures or coded-aperture masks are grids, gratings, or other patterns of materials opaque to various wavelengths of electromagnetic radiation, i.e. the illuminating wavelength range. By blocking radiation in a known pattern, a coded shadow is cast upon a plane. The properties of the original radiation sources can then be mathematically reconstructed from this shadow using an algorithm that includes knowledge about the mask pattern. Examples include Fresnel zone plates, optimized random patterns, URAs as well as hexagonal or modified URAs. The concept of coded aperture imaging itself is a well-known concept particularly in X- and gamma ray imaging systems, in which the rays cannot be focused with lenses or mirrors designed for visible light.

In some embodiments, the multispectral image sensor is transparent in the visible domain of the electromagnetic spectrum. Particularly in applications, in which unob-structed view of a scene by means of the user is desired, e.g. in heads-up displays or augmented reality wearables, the image sensor can be transparent in the visible domain. For example, the photosensitive elements are arranged on a transparent substrate in a distributed manner distant from each other such that the image sensor appears transparent to the user. Analogously, the first and second optical modulators can be configured to transmit visible light such that they also appear transparent to the user. For example, 70% of light intensity in the visible domain is transmitted by the image sensor.

In some embodiments, the plurality of photosensitive elements are arranged on a substrate, and the first and second optical modulators are formed by respective mask layers that are arranged on a front surface of the substrate. The mask layers can be transparent thin films or foils, on or in which structures are arranged that are opaque at the first and second wavelength range, respectively, but transparent outside this range. The substrate of the capturing portion comprising the photosensitive elements can be a semiconductor substrate, e.g. a silicon chip, or a transparent substrate such as a glass substrate.

In some embodiments, the multispectral image sensor further comprises one or more further optical modulators arranged on an incident side of the plurality of photosensitive elements, each further optical modulator being configured to modulate electromagnetic radiation within a respective further wavelength range, and to transmit electromagnetic radiation outside the respective further wavelength range. For example, a plurality of optical modulators forms a stack, wherein each optical modulator has a different modulation wavelength range that do not overlap. For example, each optical modulator is characterized by a narrowband modulation range, wherein the combined modulation ranges cover a certain portion of the electromagnetic spectrum, e.g. the NIR or SWIR portion. This way, a corresponding algorithm to each of the optical modulators can be applied to the same set of photo signals, in order to reconstruct an image at each of the modulation ranges for obtaining a plurality of reconstructed images.

Moreover, a multispectral camera system is provided, which comprises a multispectral image sensor according to one of the aforementioned embodiments of the multispectral image sensor, and a processing unit coupled to the multispectral image sensor and configured to reconstruct a first image for the first wavelength range and a second image for the second wavelength range by applying a set of algorithms to the photo signals generated by the photosensitive elements. The multispectral camera system can be an integrated system, in which the processing unit is embedded within the image sensor. Alternatively, the processing unit can be an external component that is coupled to active elements of the image sensor. The processing unit can further be employed to synchronize an illumination of the scene or the object by means of activating and deactivating an emission of optional illuminating light emitters with an active detection, i.e. an integration time, of the photosensitive elements. For reconstruction, the processing unit is configured to apply a set of algorithms to the photo signals, wherein the set of algorithms contains an algorithm corresponding to each of the optical modulators that takes into account a property of the respective optical modulator, e.g. a layout or pattern of a coded aperture mask. Depending on the application, the set of algorithms can be used to reconstruct images of the scene, e.g. via deconvolution or deep neural networks, or perform a specific recognition task, e.g. face identification, or feature-extraction from the raw sensor image.

Moreover, an electronic device is provided, which comprises a multispectral image sensor or a camera system according to one of the aforementioned embodiments. The electronic device can be a mobile computing device such as a smartphone, a tablet or laptop computer, or a wearable device such as smart glasses. Alternatively, a transparent image sensor or a transparent camera system can be employed in a transparent object, such as a vehicle's windshield, for forming a heads-up display with imaging capability that does not rely on projections. In particular, a transparent image sensor or camera system is employed in applications where a displaying of an image is desired, while at the same time maintaining an unobstructed line-of-sight behind the display from the user's point of view. In such devices, the display can serve as augmented reality display or for displaying data detected in the field of view of the display's image sensor and the user, e.g. recognized speed limits from road signs, for instance.

Furthermore, a method of manufacturing a multispectral image sensor is provided. The method comprises providing a plurality of photosensitive elements, each configured to capture electromagnetic radiation received from a scene or an object and to generate a photo signal depending on the captured electromagnetic radiation. The method further comprises providing a first optical modulator arranged on an incident side of the plurality of photosensitive elements, the first optical modulator being configured to modulate electromagnetic radiation within a first wavelength range, and to transmit electromagnetic radiation outside the first wavelength range. The method further comprises providing a second optical modulator arranged on an incident side of the plurality of photosensitive elements, the second optical modulator being configured to modulate electromagnetic radiation within a second wavelength range, and to transmit electromagnetic radiation outside the second wavelength range. The first wavelength range is different form the second wavelength range.

Further embodiments of the method become apparent to the skilled reader from the aforementioned embodiments of the multispectral image sensor, the camera system, and the electronic device, and vice-versa.

The following description of figures may further illustrate and explain aspects of the transparent display, the imaging system and the method of manufacturing a transparent display. Components and parts of the transparent display that are functionally identical or have an identical effect are denoted by identical reference symbols. Identical or effectively identical components and parts might be described only with respect to the figures where they occur first. Their description is not necessarily repeated in successive figures.

In the figures:

FIGS. 4A and 4B.

Figure 1:
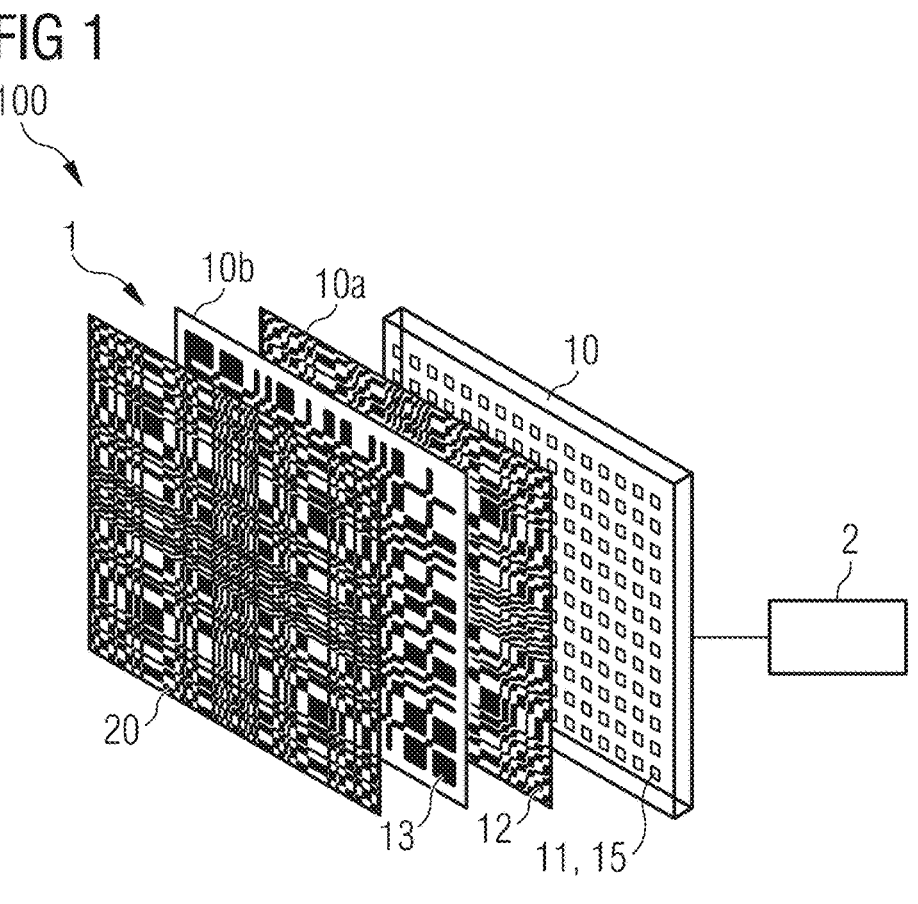
FIG. 1 shows an exemplary embodiment of a camera system comprising a first exemplary embodiment of a multispectral image sensor according to the improved concept.

FIG. 1 shows an exploded schematic view of an exemplary embodiment of a camera system 100 comprising a multispectral image sensor 1 according to the improved concept. The camera system 100 further comprises a processing unit 2 that is electrically coupled to the image sensor 1, e.g. to an integrated circuit of the image sensor 1. The processing unit 2 is configured to receive the photo signals from the image sensor 1 and to reconstruct images by means of applying a set of algorithms to the photo signals. The reconstruction is further detailed in FIG. 5 and in the corresponding section of the disclosure.

The image sensor 1 comprises a substrate 10, which is a semiconductor substrate such as a silicon chip, for instance. The substrate 10 can alternatively be of a material that is transparent in the visible domain of the electromagnetic spectrum, e.g. glass. The substrate 10 can also be a thin film or a foil. The substrate comprises a plurality of photosensitive elements 11, e.g. photodiodes. For example, the photosensitive elements 11 are silicon-based micro photodiodes having a sensitive surface arranged on a front or top surface of the substrate 10. For example, the photosensitive elements 11 are buried photodiodes.

Alternatively, the photosensitive elements 11 can be organic photodiodes. The photosensitive elements 11 can be arranged in a matrix, wherein they are spaced apart or in close proximity to each other. Combined, the photosensitive elements 11 form the capturing portion of the image sensor 1. The photosensitive elements 11 on their incident side can comprise a coating or a filter element for blocking visible light.

Optionally, the image sensor 1 can further comprise one or more illuminating light emitters 15 that are arranged on the substrate 10. The illuminating light emitters 15 which are configured to illuminate a scene or an object such that the photosensitive elements 11 capture the light that is emitted by the illuminating light emitters 15 and reflected by the object or scene. The illuminating light emitters 15 are configured to emit light at the first and/or second wavelength range. The illuminating light emitter 15 can be micro LEDs or VCSELs, for instance. The illuminating light emitters 12 can be arranged in an outer periphery of the photosensitive elements 11. For example, the illuminating light emitters 12 are configured to emit light in the NIR or SWIR domain. Alternatively, the illuminating light emitters 15 can be arranged on a further substrate arranged on a capturing surface of the substrate 10, wherein the further substrate is transparent at least at the first and second wavelength ranges.

The image sensor 1 further comprises a first optics substrate 10a and a second optics substrate 10b. On the first optics substrate 10a, the first optical modulator 12 is arranged. On the second optics substrate 10b, the second optical modulator 13 is arranged. The first and second optical modulators 12, 13 realize optical encoders for lensless imaging. For example, the optical modulators 12, 13 are passive modulators realized by an amplitude mask, a phase mask, or a plurality of diffractive elements. Examples include an arrangement of pinholes, a diffusor, a Fresnel zone plate, and coded aperture masks characterized by a uniformly redundant array or an optimized random pattern, for instance. The optical modulators 12, 13 are engineered to only manipulate light at or around a certain wavelength range, e.g. a portion of the NIR or SWIR domain. Therein, the first optical modulator 12 manipulates light at a first wavelength range, while the second optical modulator 13 manipulates light at a second wavelength range different from the first wavelength range. The first and second wavelength ranges do not overlap. Thus, the first optical modulator is transparent at the second wavelength range, and vice versa. The optical modulators 12, 13 can further be transparent in the visible domain such that the image sensor can perform conventional imaging, for instance.

In this embodiment, the image sensor 1 further comprises an additional optical modulator 20, e.g. arranged on a further optics substrate. Therein, the additional optical modulator 20 interacts with light at a further wavelength range that is different from and does not overlap with the first and second wavelength ranges. Outside the further wavelength range, the additional optical modulator 20 is transparent. Further embodiments can comprise a larger number of optical modulators forming a modulator stack. For example, each optical modulator 12, 13, 20 is characterized by a narrow optical bandwidth, at which light is modulated, wherein the combined bandwidths of all optical modulator 12, 13, 20 span across a portion of the electromagnetic spectrum, e.g. the NIR or SWIR domain.

The layers formed from the substrate 10, the optics substrates 10a, 10b as well as optional further substrates, e.g. of further optical modulators 20 and/or a substrate with the optional illuminating light emitters 15, are arranged in a stacked manner, optionally with spacers in between, to form the finalized multispectral image sensor 1 and camera system 100 with lensless imaging capability. The image sensor 1 can comprise further layers, e.g. a circuit substrate comprising active and passive circuitry for operating the image sensor 1.

Figure 2:
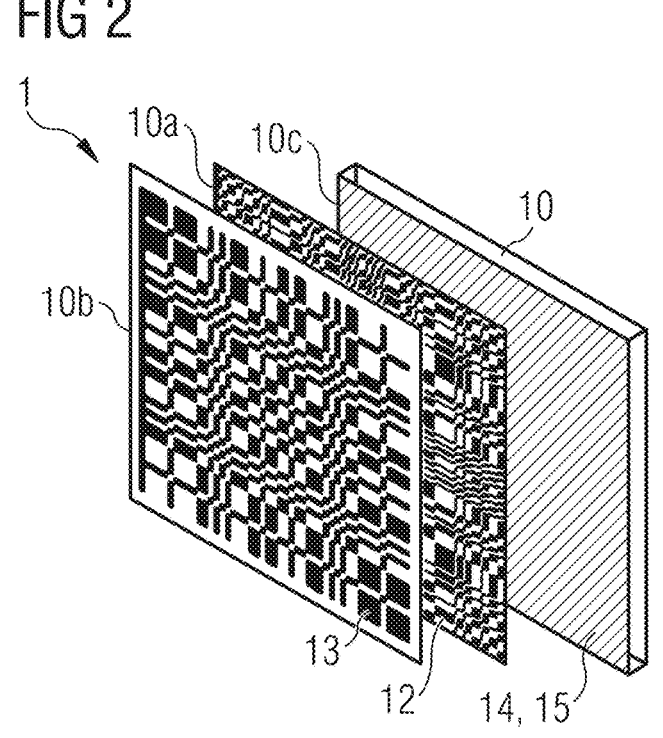
FIG. 2 shows a second exemplary embodiment of a multispectral image sensor.

FIG. 2 shows a second exemplary embodiment of a multispectral image sensor 1. Compared to the first embodiment of FIG. 1, this embodiment further comprises a display substrate 10c, which is arranged on the incident side of the substrate 10 with the photosensitive elements 11, the latter not shown in the figure for illustration purposes. Alternatively, the display substrate 10c can be the topmost layer of the stack formed from the optical modulators 12, 13, 20. The display substrate 10c comprises a plurality of display pixels 14. The display pixels 14 can be arranged in a two-dimensional matrix arrangement such that a display can be formed for displaying an image in the visible domain. The display pixels 14 can comprise RGB light emitters such as OLEDs or micro LEDs. The display substrate 10c is transparent at the wavelength ranges of all modulators 12, 13, 20, such that the captured image is not falsified by the display layer. Moreover, the display pixels 14 can be arranged distant from each other such that light of the first and second wavelength ranges can pass through gaps in between the display pixels 14 for reaching the photosensitive elements 11.

Analogously, the optical modulators 12, 13, 20 and the optics substrates 10a, 10b are transparent in the visible domain such that a displayed image on the display layer can be viewed by a user. In addition to or alternatively to illuminating light emitters 15 arranged on the substrate 10, the display substrate 10c can likewise comprise one or more illuminating light emitters 15 arranged on its surface.

Figure 3:
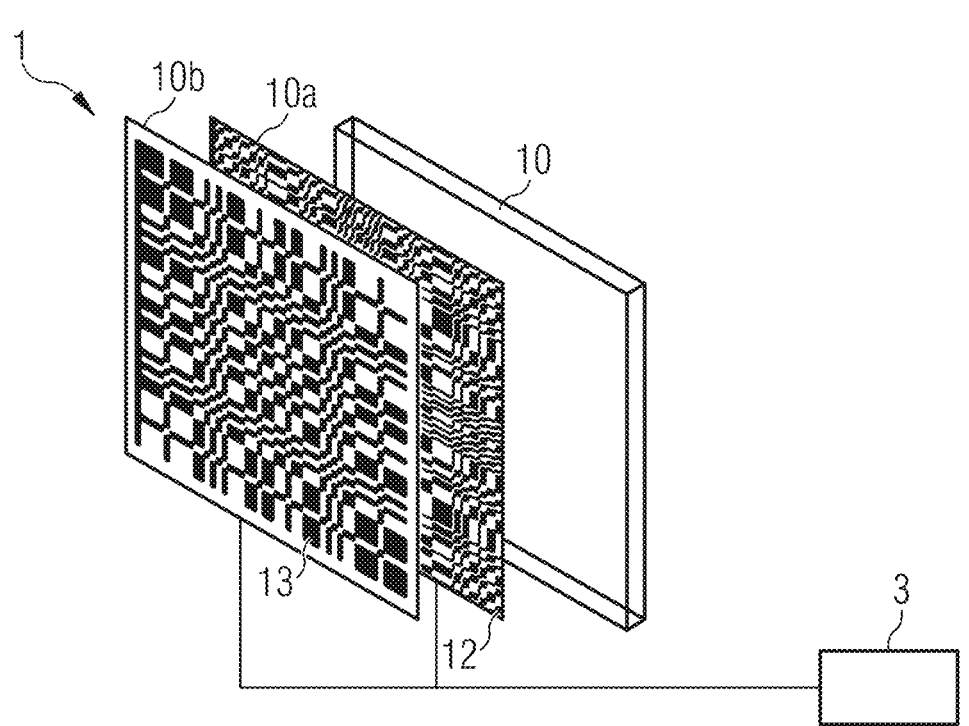
FIG. 3 shows a third exemplary embodiment of a multispectral image sensor.

FIG. 3 shows a third exemplary embodiment of a multispectral image sensor 1. Compared to the embodiments of FIGS. 1 and 2, in this embodiment the first and second optical modulators 12, 13, or alternatively one of them, are active elements, i.e. realized by means of an active matrix. Hence, the image sensor 1 further comprises a controller 3 that is electrically coupled to the active optical modulators 12, 13 for controlling elements of the active matrix. The active matrix can comprise liquid crystals, optical switches, and/or other types of spatial and digital light processors. For example, the optical modulators 12, 13 are based on liquid crystal technology, which can be used for programmable amplitude modulation. For programmable phase modulation, LC on silica devices can be employed in the active matrix. Further examples include vanadium oxide transistors acting as optical switches in the NIR region while being transmissive at visible frequencies.

A programmable optical modulator 12, 13 has the advantage that a mask pattern can be easily and quickly changed such that multiple images, each with different optical encoding, can be captured in a subsequent manner. Moreover, in embodiments with a relatively small number of photosensitive elements 11, a programmable modulator 12, 13 can facilitate the obtainment of sufficient measurements for reconstruction. Also, in case of a sensor array of photosensitive elements 11, the ability to change the modulation pattern between acquisitions provides an extra degree of freedom that can further improve a reconstruction performance or a resolution of the reconstructed image. The controller 3 can be coupled to the processing unit 2 of an imaging system to be synchronized with an emission of the illuminating light emitters 15 and a detection of the photosensitive elements 11, i.e. an exposure phase.

Figure 4A:
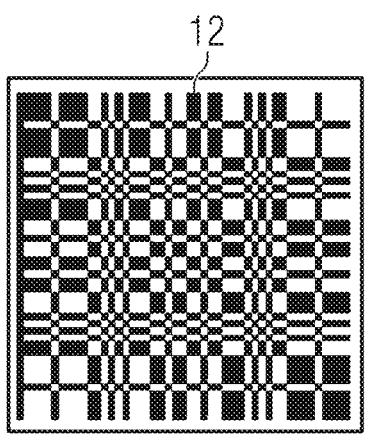
FIGS. 4A and 4B shows show exemplary embodiments of optical modulators employed in an image sensor.
Figure 4B:
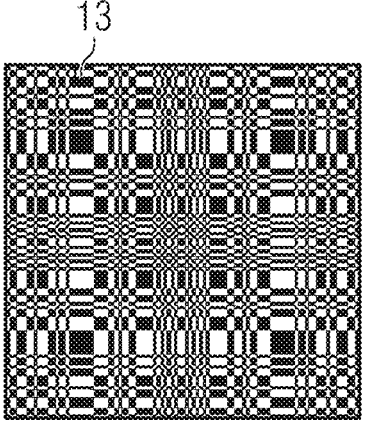

FIGS. 4A and 4B show exemplary embodiments of optical modulators 12, 13 employed in an image sensor 1 according to the improved concept. More specifically, FIG. 4A shows an amplitude mask as the first optical modulator 12, while FIG. 4B shows another amplitude mask as the second optical modulator 13. Therein, the first optical modulator 12 is responsive to a first wavelength range characterized by a first center wavelength $\lambda_1$ and a bandwidth, while the second optical modulator 13 is responsive to a second wavelength range characterized by a second center wavelength $\lambda_2$ and a further bandwidth. For example, the bandwidths of the optical modulators 12, 13 are identical but the center wavelengths $\lambda_1$, $\lambda_2$ differ from each other such that the first and second wavelength ranges do not overlap. More specifically, the amplitude masks illustrate the case that the respective darker areas block only the radiation at the respective wavelength range comprising $\lambda_1$ or $\lambda_2$ and are transparent anywhere else. The bright areas are transparent to any wavelength.

Figure 5A:
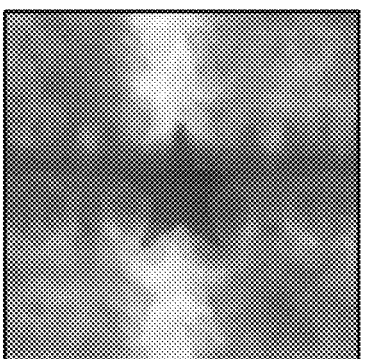
FIGS. 5A and 5B shows show exemplary reconstructed images captured using the optical modulators of FIG. 4.
Figure 5B:
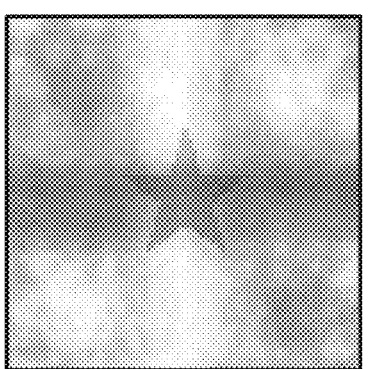

FIGS. 5A and 5B show exemplary reconstructed images captured using the optical modulators 12, 13 of FIGS. 4A and 4B during a single exposure of a capturing range that includes the first and second wavelength ranges. To this end, a reconstruction algorithm is applied for each of the reconstructed images. In this example, a simple reconstruction deconvolution is applied for the first and second wavelength ranges for a two-layer stack of optical modulators. However, this serves illustrative purposes only and more sophisticated algorithms may lead to superior results. Nevertheless, the requirement of the algorithm can be tailored to the application, such that an optimal algorithm is employed in order to maintain a certain level of computational complexity for energy and time saving purposes, for instance.

In the following, the working principle of the algorithms will be explained for a stack of N coded masks superimposed on top of each other and formed from stack of a plurality of optical modulators 12, 13, 20 arranged above the photosensitive elements 11 of the capturing portion of the image sensor 1. As already discussed above for the two-layer-stack, a mask of the stack identified as $A_j$ is responsive to a certain wavelength $A_j$. The object irradiance O at $\lambda_j$ will be processed only by the mask $A_j$ producing the sensor signal $R_j$:

$$R_j = A_j * O(\lambda_j),$$

wherein "*" denotes the convolution operation. Because the object or scene being captured by the image sensor 1 irradiates at other wavelengths as well, the total sensor signal after a single exposure period or integration time will be:

$$\sum_{i=1}^{N} R_i = \sum_{i=1}^{N} A_i * O(\lambda_i).$$

If the image reconstruction $\tilde{O}(\lambda_j)$ is required, wherein "~" denotes an approximation, and the matched filter technique is applied, it follows:

$$\tilde{O}_j = \left(\sum_{i=1}^{N} R_i\right) * G_j = R_j * G_j + \sum_{i=1, i \neq j}^{N} R_i * G_j = \tilde{O}(\lambda_j) + \sum_{i=1, i \neq j}^{N} R_i * G_j.$$

In the example of a stack of two optical modulators 12, 13 as illustrated in FIGS. 4 and 5, it is worth noticing that despite the artifacts produced by the term $$\sum_{i=1, i \neq j}^{N} R_i * G_j,$$

the object $\tilde{O}(\lambda_j)$, a star shape, is still recognizable.

Depending on the specific application, the algorithm can be used to reconstruct the image, e.g. based on a deconvolution or a convolutional neural network. Alternatively, a specific machine learning algorithm can be employed for recognizing features at different wavelength. Thirdly, gaining of a certain information at different wavelengths can aid to increase the accuracy of machine learning models. It is notorious that to train neural networks a large amount of reference data is required. With the present multispectral image sensor 1, multispectral information can be gained using a single exposure. For instance, if the application requires a specific wavelength domain, without having the detecting element on that specific band, e.g. detecting IR from RGB images or vice versa, the present idea can provide the reference data in one single system.

Moreover, if the layer stack materials are chosen to be transparent in the visible range, it is possible to realize the so-called bidirectional displays, in which an image sensor is embedded underneath an OLED (or micro-LED) layer forming the emitting display. The layer stack will not interfering with the displayed information due to its transparency in the visible domain.

Figure 6:
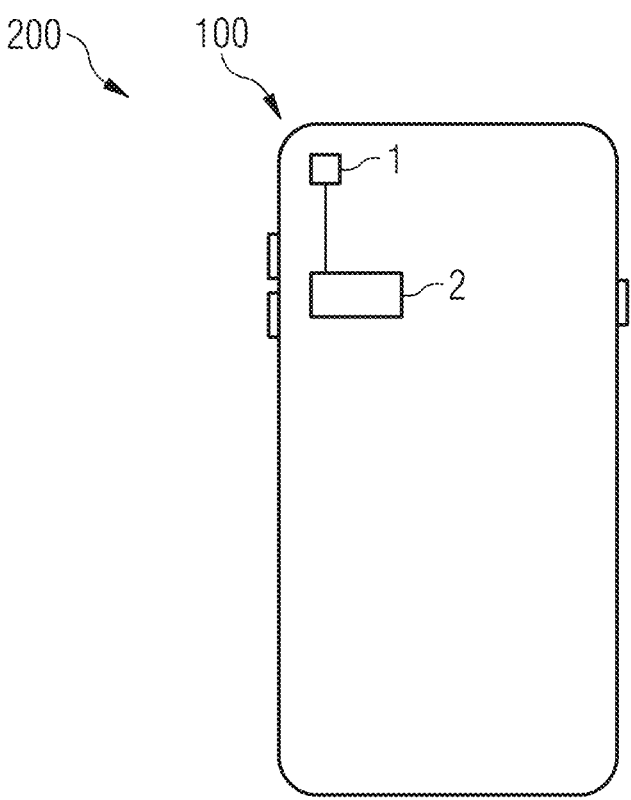
FIG. 6 shows an embodiment of an electronic device comprising a camera system.

FIG. 6 shows an embodiment of an electronic device 200, e.g. a smartphone or a smart watch, comprising a camera system 100 according to the improved concept. The camera system 100 comprises a multispectral image sensor 1 and a processing unit 2 electrically coupled to the image sensor 1.

The embodiments of the multispectral image sensor 1, the camera system 100 and the method of manufacturing a multispectral image sensor 1 disclosed herein have been discussed for the purpose of familiarizing the reader with novel aspects of the idea. Although preferred embodiments have been shown and described, changes, modifications, equivalents and substitutions of the disclosed concepts may be made by one having skill in the art without unnecessarily departing from the scope of the claims.

It will be appreciated that the disclosure is not limited to the disclosed embodiments and to what has been particularly shown and described hereinabove. Rather, features recited in separate dependent claims or in the description may advantageously be combined. Furthermore, the scope of the disclosure includes those variations and modifications, which will be apparent to those skilled in the art and fall within the scope of the appended claims.

The term "comprising", insofar it was used in the claims or in the description, does not exclude other elements or steps of a corresponding feature or procedure. In case that the terms "a" or "an" were used in conjunction with features, they do not exclude a plurality of such features. Moreover, any reference signs in the claims should not be construed as limiting the scope.

| References | | |
| --- | --- | --- |
| 1 | image sensor | |
| 2 | processing unit | |
| 3 | controller | |
| 10, 10a, 10b, 10c | substrate | |
| 11 | photosensitive element | |
| 12, 13, 20 | optical modulator | |
| 14 | display pixel | |
| 15 | illuminating light emitter | |
| 100 | camera system | |
| 200 | electronic device | |

The invention claimed is:

1. A multispectral image sensor, comprising:
a plurality of photosensitive elements, each configured to capture electromagnetic radiation received from a scene or an object and to generate a photo signal depending on the captured electromagnetic radiation; and
a first optical modulator arranged on an incident side of the plurality of photosensitive elements, the first optical modulator being configured to modulate electromagnetic radiation within a first wavelength range, and to transmit electromagnetic radiation outside the first wavelength range; and
a second optical modulator arranged on an incident side of the plurality of photosensitive elements, the second optical modulator being configured to modulate electromagnetic radiation within a second wavelength range, and to transmit electromagnetic radiation outside the second wavelength range;
wherein the first wavelength range is different form the second wavelength range; and
wherein the first and/or second optical modulator is realized by a spatially distributed plurality of pinholes or by a passive matrix that is based on a phase mask.

2. The multispectral image sensor according to claim 1, wherein the first and second wavelength ranges do not overlap.

3. The multispectral image sensor according to claim 1, wherein the first wavelength range is in the visible, near-infrared, NIR, or short-wavelength infrared, SWIR, portion of the electromagnetic spectrum.

4. The multispectral image sensor according to claim 1, wherein the second wavelength range is in the visible, near-infrared, NIR, or short-wavelength infrared, SWIR, domain of the electromagnetic spectrum.

5. The multispectral image sensor according to claim 1, wherein the photosensitive elements are silicon-based photodiodes or organic photodetectors, OPDs.

6. The multispectral image sensor according to claim 1, further comprising a plurality of display pixels configured to generate a display image in the visible domain of the electromagnetic spectrum.

7. The multispectral image sensor according to claim 6, wherein the plurality of display pixels form an OLED display, a micro-LED display or a liquid crystal display, LCD.

8. The multispectral image sensor according to claim 1, further comprising a plurality of illuminating light emitters configured to illuminate the scene or the object with electromagnetic radiation within the first and/or second wavelength range.

9. The multispectral image sensor according to claim 8, wherein the illuminating light emitters are OLEDs, micro-LEDs or vertical-cavity surface-emitting lasers, VCSELs.

10. The multispectral image sensor according to claim 1, wherein the first and/or second optical modulator is realized by an active matrix that is based on one of: liquid crystals, optical switches, digital light processors and spatial light processors.

11. The multispectral image sensor according to claim 1, wherein the first and/or second optical modulator is realized by a passive matrix that is based on one of: an amplitude mask, a phase mask, and a plurality of diffractive elements.

12. The multispectral image sensor according to claim 1, wherein the first and/or second optical modulator is realized by a spatially distributed plurality of pinholes.

13. The multispectral image sensor according to claim 1, wherein the first and/or second optical modulator is realized by a dye-based polymer.

14. The multispectral image sensor according to claim 1, wherein the first and/or second optical modulator forms a coded aperture mask, in particular characterized by a uniformly redundant array, URA, or an optimized random pattern, ORA.

15. The multispectral image sensor according to claim 1, wherein the multispectral image sensor is transparent in the visible domain of the electromagnetic spectrum.

16. The multispectral image sensor according to claim 1, wherein
the plurality of photosensitive elements are arranged on a substrate; and
the first and second optical modulators are formed by respective mask layers that are arranged on a front surface of the substrate.

17. The multispectral image sensor according to claim 1, further comprising one or more further optical modulators arranged on an incident side of the plurality of photosensitive elements, each further optical modulator being configured to modulate electromagnetic radiation within a respective further wavelength range, and to transmit electromagnetic radiation outside the respective further wavelength range.

18. A camera system, comprising:
a multispectral image sensor according to claim 1; and
a processing unit coupled to the multispectral image sensor and configured to reconstruct a first image for the first wavelength range and a second image for the second wavelength range by applying a set of algorithms to the photo signals generated by the photosensitive elements.

19. An electronic device comprising a multispectral image sensor according to claim 1 or a camera system according to claim 18.

20. A method of manufacturing a multispectral image sensor, the method comprising:
providing a plurality of photosensitive elements, each configured to capture electromagnetic radiation received from a scene or an object and to generate a photo signal depending on the captured electromagnetic radiation;

providing a first optical modulator arranged on an incident side of the plurality of photosensitive elements, the first optical modulator being configured to modulate electromagnetic radiation within a first wavelength range, and to transmit electromagnetic radiation outside the first wavelength range; and providing a second optical modulator arranged on an incident side of the plurality of photosensitive elements, the second optical modulator being configured to modulate electromagnetic radiation within a second wavelength range, and to transmit electromagnetic radiation outside the second wavelength range;

wherein the first wavelength range is different from the second wavelength range; and wherein the first and/or second optical modulator is realized by a spatially distributed plurality of pinholes or by a passive matrix that is based on a phase mask.

\* \* \* \* \*